United States Patent [19]

Goulart et al.

[11] Patent Number: 5,318,385

[45] Date of Patent: Jun. 7, 1994

[54] SUPPORTING SYSTEM FOR LINES AND CONDUCTOR PIPES AT OFFSHORE PLATFORMS

[75] Inventors: Roberto de Oliveira Goulart; Fernando José D. Neder, both of Rio de Janeiro, Brazil

[73] Assignee: Petroleo Brasileiro S.A.-Petrobras, Rio de Janeiro, Brazil

[21] Appl. No.: 936,214

[22] Filed: Aug. 27, 1992

[30] Foreign Application Priority Data

Aug. 29, 1991 [BR] Brazil ................... 9103728

[51] Int. Cl.⁵ .................... E02B 17/00; B63B 35/44
[52] U.S. Cl. .................. 405/195.1; 166/341; 405/223.1; 405/224.2
[58] Field of Search ............ 405/169, 195.1, 223.1, 405/224, 224.2; 166/348, 349, 359, 341, 342, 343, 351, 352, 354

[56] References Cited

U.S. PATENT DOCUMENTS

| | | | |
|---|---|---|---|
| 4,109,478 | 8/1978 | Gracia | 405/224.2 X |
| 4,469,181 | 9/1984 | Kellett | 166/341 |
| 4,784,529 | 11/1988 | Hunter | 405/223.1 X |
| 4,960,174 | 10/1990 | Rodrigues et al. | 166/349 X |

*Primary Examiner*—David H. Corbin
*Attorney, Agent, or Firm*—Sughrue, Mion, Zinn, Macpeak & Seas

[57] ABSTRACT

A supporting system for lines and connecting pipes at offshore platforms consists of a supporting structure next to an offshore platform structure. The supporting structure consists of cones lying at the supporting structure, each of which is equipped in a front with a slot for receiving a flexible stretch of a line inserted into the slot. At the end of the line to be supported at the offshore platform, there is a support arrangement to support the line linked to the neck of a connector. The arrangement consists of top and bottom plates, between which is provided a set of vanes which extend radially and which lie equally apart. The set of vanes include two half-round vanes lying in the middle of the support arrangement, the vanes being connected at their top and top to respective top and bottom plates.

4 Claims, 8 Drawing Sheets

SUPPORTING SYSTEM FOR LINES AND CONDUCTOR PIPES AT OFFSHORE PLATFORMS

FIELD OF INVENTION

This invention is to a supporting system for lines and conductor pipes at offshore platforms, whereby the lines are installed laterally by the flexible stretch thereof, being fed into an opening in the platform structure, which enables such installation to be achieved with greater ease and with less vessel time being needed, as well as making it easier to pull out the line at any time.

DESCRIPTION OF THE PRIOR ART

The great number of lines and conductor pipes that have to be put in and pulled out from floating production platforms means that more concern is being shown towards making such work easier, for to put in such lines means requires a suitable kind of boat involving high cost.

Systems currently in use employ an assembly consisting of a supporting structure to hold the line up by means of an intermediate flange. This supporting structure is connected to the structure that bears the line. The line is inserted into the structure opening that contains the end fittings, the pulling head, connected to the intermediate flange by means of bolts. Next the line is bolted to the supporting structure, which is split in two, and is finally seated on the supporting structure and connected up with bolts.

However, the chief drawback to the system referred to above is that it takes up more boat time since the use of bolts makes any putting in and pulling out of lines rather laborious, and cannot of course be done underwater, to say nothing of the heavy weight of the supporting assembly for the lines and umbilicals.

SUMMARY OF INVENTION

To find an answer to the drawbacks referred to above, this invention provides a system meant to support offshore platform lines and conductor pipes consisting of a supporting structure adjacent to the offshore platform structure itself, made up of cones, at the top, with openings therein to take the flexible stretch of the lines, and which on its outside is provided with properly spaced stiffeners, and which may be provided with a guiding device welded, at the back, meant to steer flexible lines into place. At the end of the line, which is to be supported at the offshore platform, there is an assembly to support the line linked to the neck of the connector, which may be split in two, consisting of a plate at the bottom and another at the top, on which a set of vanes are spaced out at equal distances from one another, two half-round ones in the middle, which arrangement is tied by means of an intermediate flange to the pulling head and the line terminal, respectively, that overlie one another and are of the same diameter. This line supporting assembly, linked to the connector neck, may also be made together with the line connector as one whole part, or otherwise, conically machined or of welded carbon steel.

BRIEF DESCRIPTION OF DRAWINGS

The invention is now described in greater detail with the help of the drawings provided herewith, where.

DETAILED DESCRIPTION OF INVENTION

Before starting to describe the supporting system for lines and connecting pipes as invented, reference is made to the prior art type of supporting system as shown in FIGS. 1 to 5. As is seen from FIGS. 1 to 5, that system consists of a supporting arrangement, 30, to hold up line, 31, with the aid of an intermediate flange, 33, supporting structure, 30, being linked to the holding structure (not shown). Line 31 is inserted into the slot with the end fittings, 35, the head of part 37, connected to intermediate flange, 33, by means of bolt, 39, and then, the line, 31, is bolted to supporting structure, 30, by means of bolt, 41, which is split in two, and is finally seated upon the structure, by joining it with bolt, 43, such a system is not ideal because of the drawbacks already referred to herein.

Figure 1:
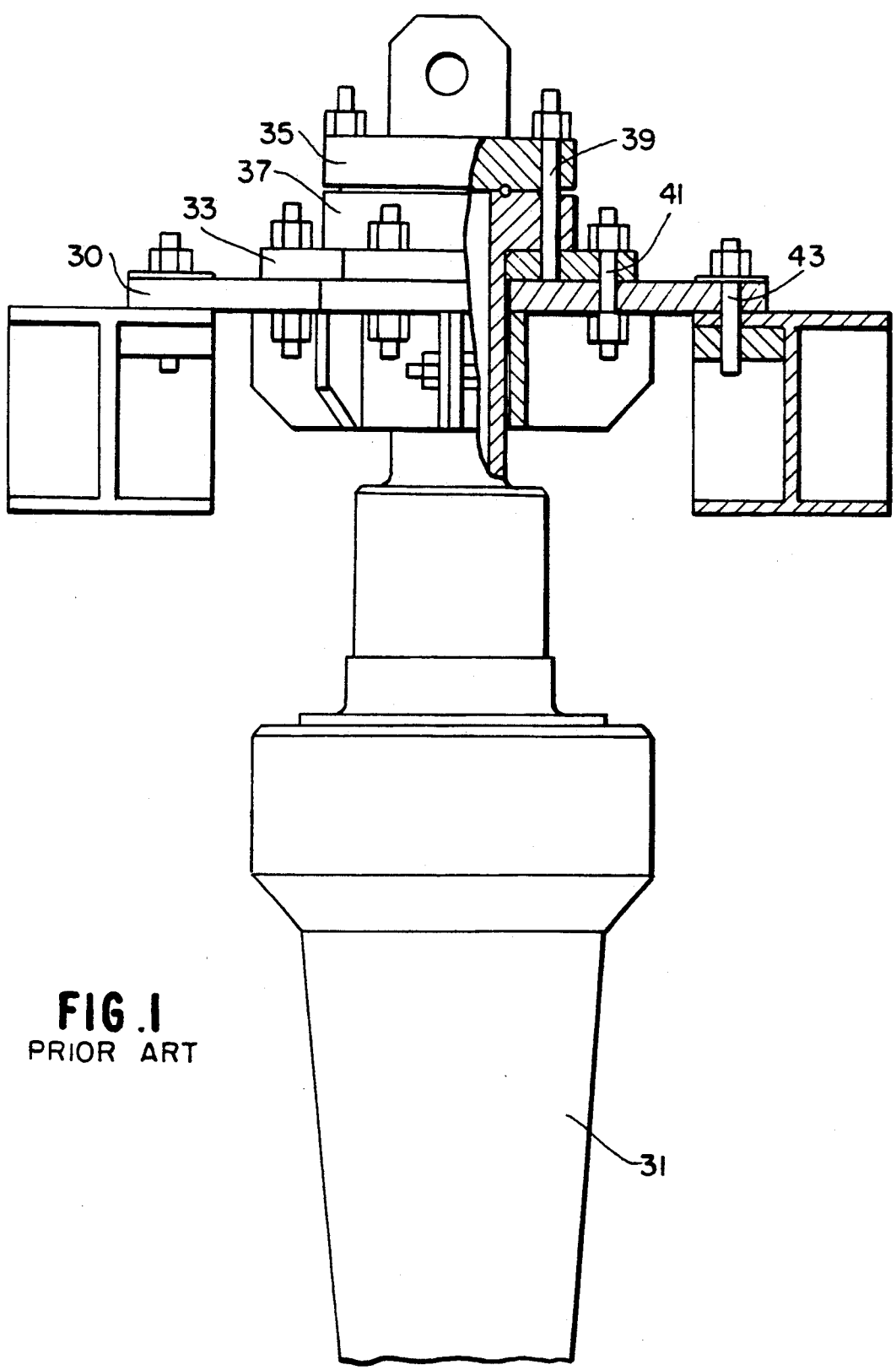
FIG. 1 is a front view in part section of a single supporting assembly for umbilical lines of Prior Art method.
Figure 2:
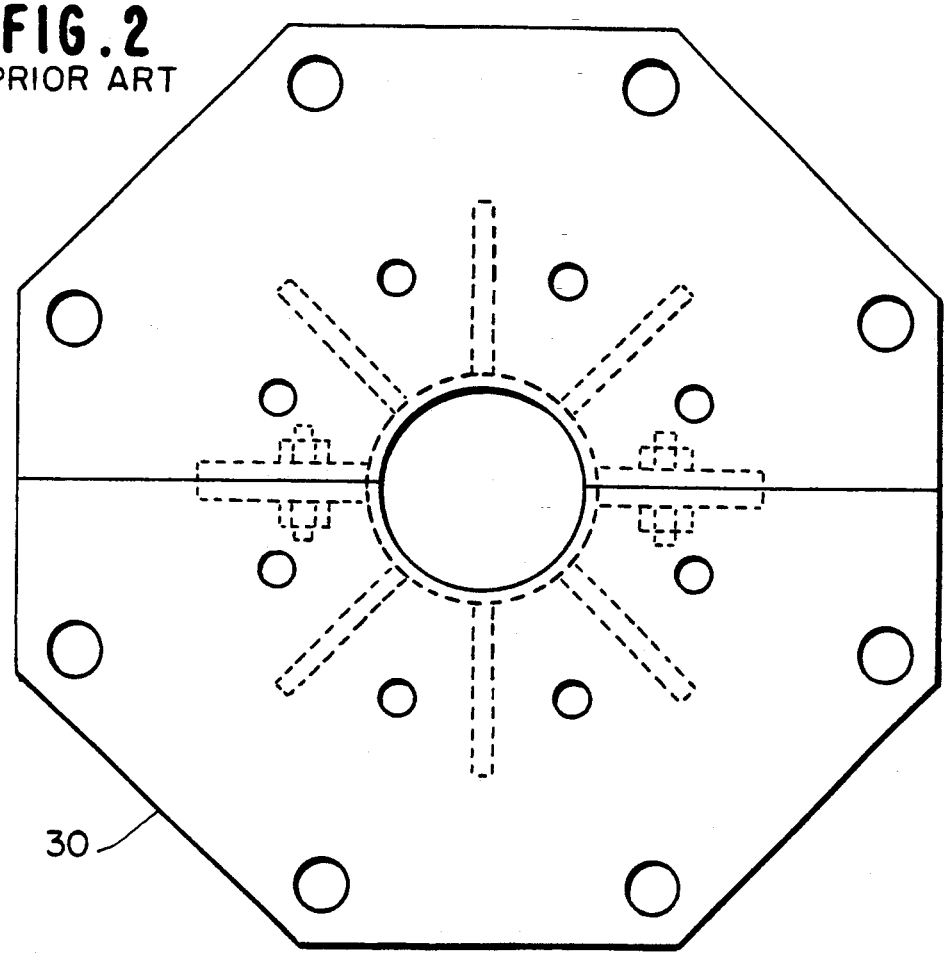
FIGS. 2 and 3 are top and section views respectively of supporting structure of the assembly shown in FIG. 1.
Figure 3:
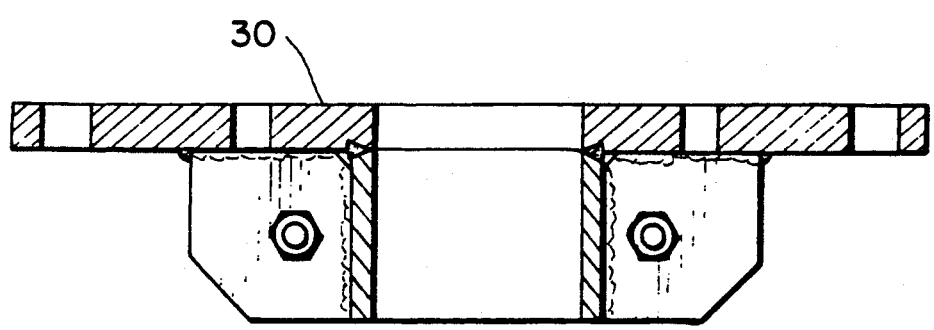
Figure 4:
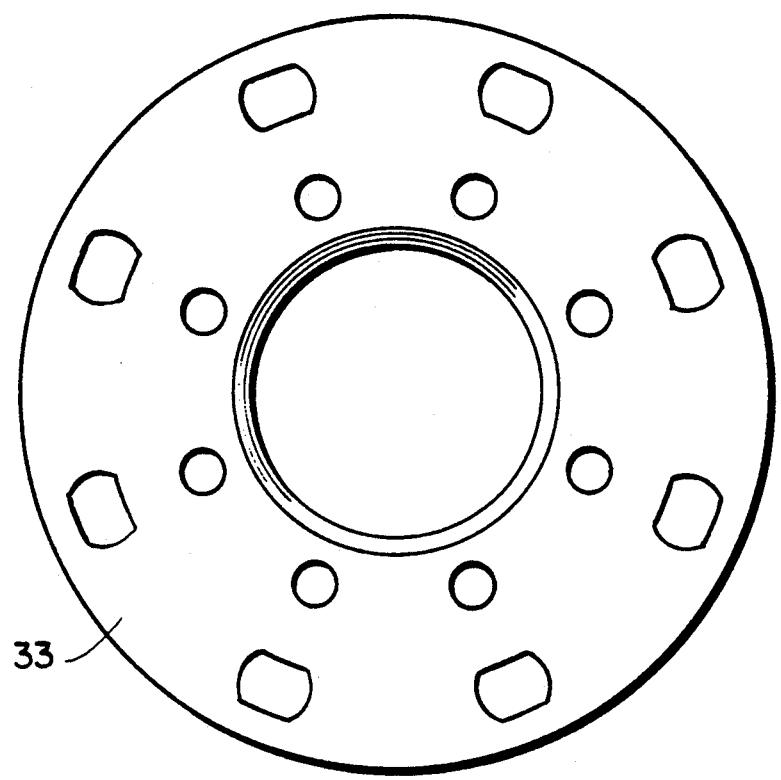
FIGS. 4 and 5 are top and section views respectively of the intermediate flange for the assembly shown in FIG. 1.
Figure 5:
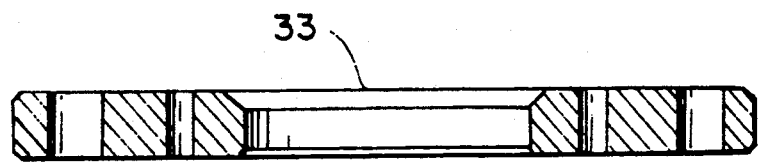
Figure 6A:
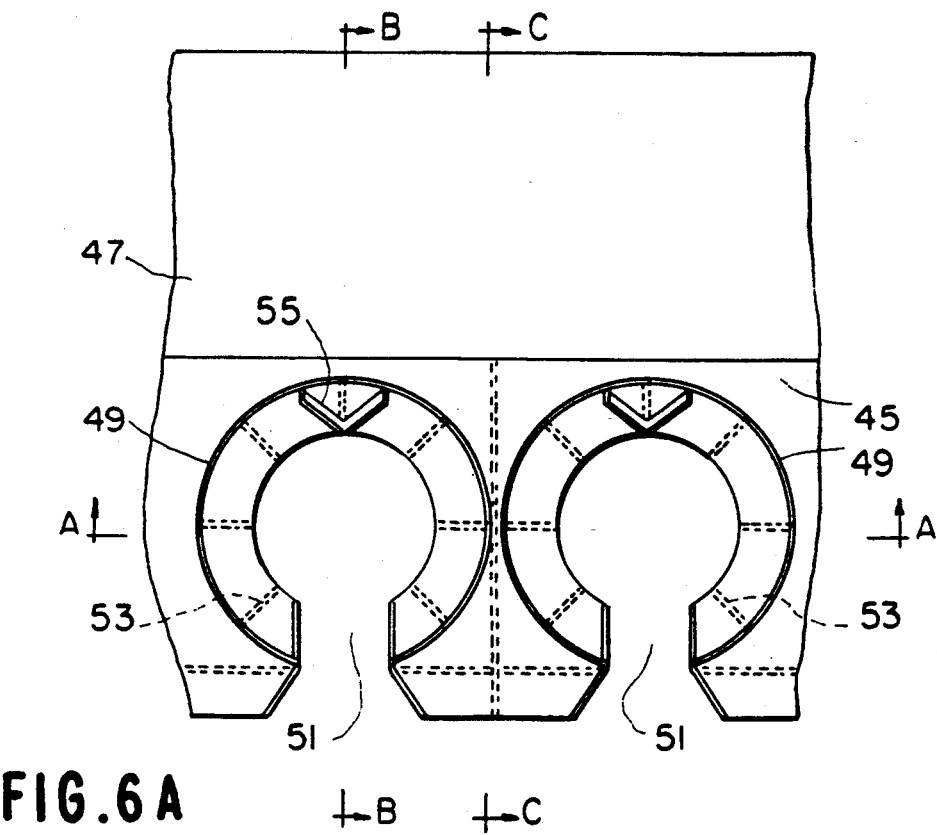
FIG. 6A is a top view of the supporting structure for lines and conductor pipes of a system forming a preferred embodiment of the invention.
Figure 6B:
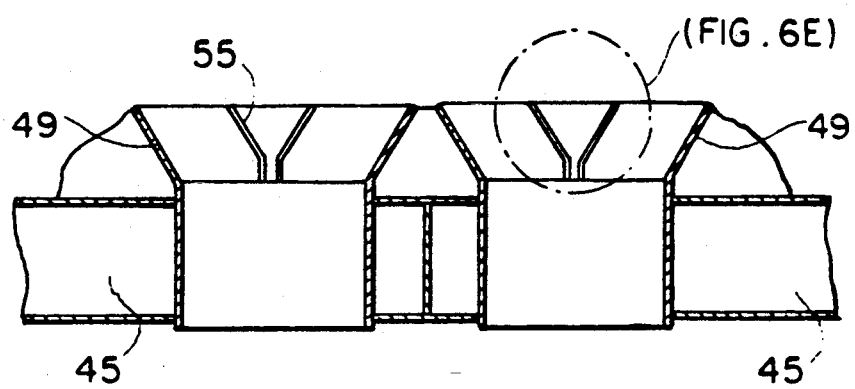
FIGS. 6B, 6C and 6D are sections respectively taken about AA, BB and CC from FIG. 6A.
Figure 6C:
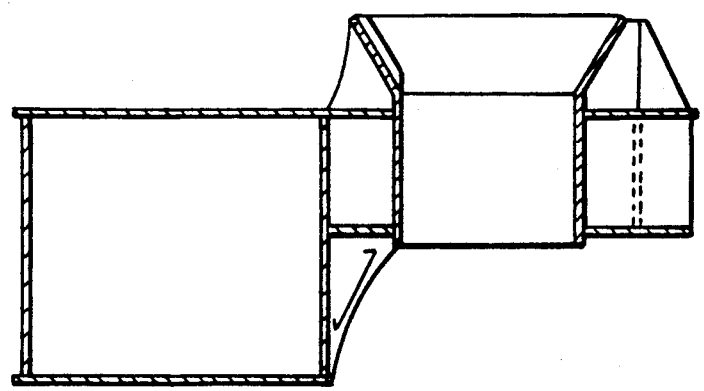
Figure 6D:
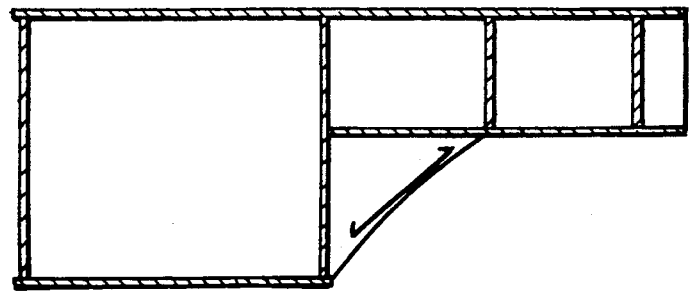
Figure 6E:
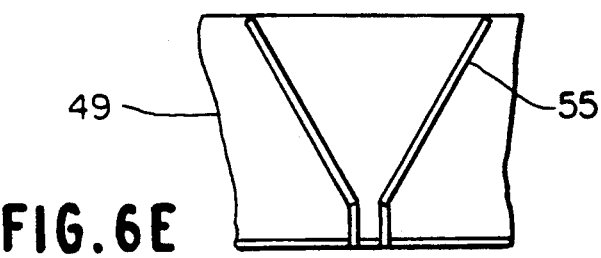
FIG. 6E is a blowup of detail A taken from FIG. 6B showing a guiding device that can be provided to prevent angular movement and keep lines in proper position.
Figure 9A:
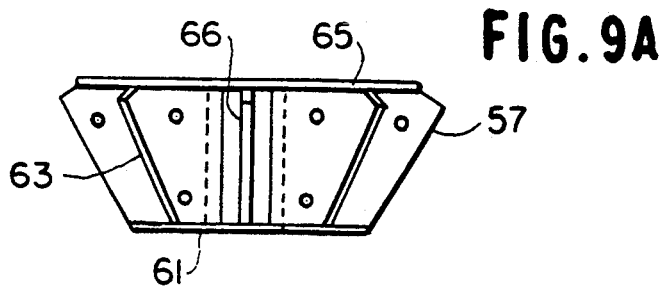
FIGS. 9A, 9B and 9C are a front view of the line supporting arrangement, and a top view thereof and of the intermediate flange, respectively, as used in the system invented.
Figure 9B:
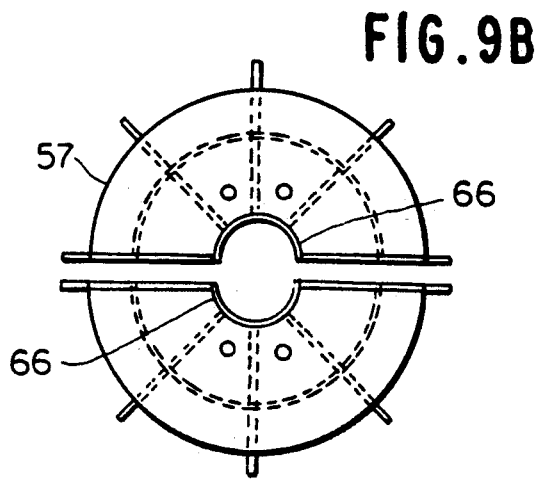
Figure 9C:
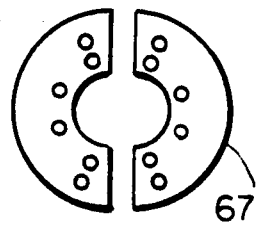

As is to be seen from FIGS. 6A–6D, the supporting system for lines and connecting pipes at offshore platforms forming a preferred embodiment of the invention consists of supporting structure, 45, next to an offshore platform structure, 47, consisting of cones, 49, lying at the top of a supporting structure, 45, equipped in front with slots, 51, for receiving a flexible stretch of lines the structure 45 is, provided to the outside, with stiffeners, 53, properly placed and, optionally, with a guiding device, 55, welded on to the back thereof, meant to prevent angular shift of line and to make it easier to position same, as shown in blowup at FIG. 6E. At end of the line to be supported at offshore platform 47 and as seen from FIGS. 9A-9C, there is a support arrangement, 57, FIG. 7A, to support the line 73, linked to the neck of connector, 59. A blowup of the support arrangement is shown in FIG. 9A, consisting of a bottom plate, 61, at the bottom, and a plate, 65, at the top, upon which a set of vanes, 63, lie spaced equally apart. Two of the plates, 66, are half-round, lying in the middle part, connected at top and bottom to the aforesaid plates, 61, 65, FIG. 9A. This support arrangement, 57, is fixed by means of an intermediate flange, 69, to a split head, 69, FIG. 10, and end fitting, 71, respectively, lying over one another and being of same dimeter.

Figure 7A:
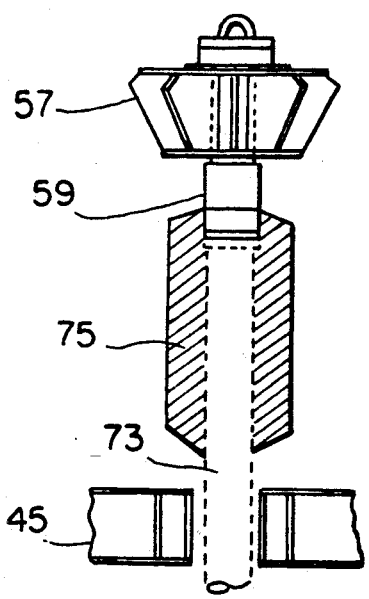
FIGS. 7A, 7B and 7C are vertical sections which show how a flexible line is put in with use of the system as invented.
Figure 7B:
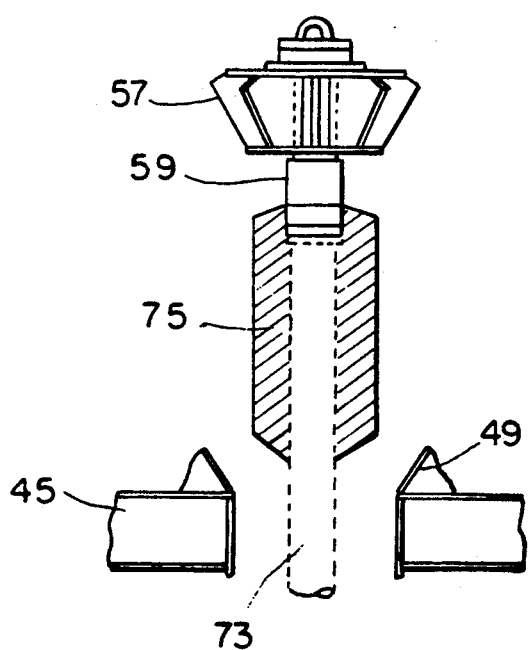
Figure 7C:
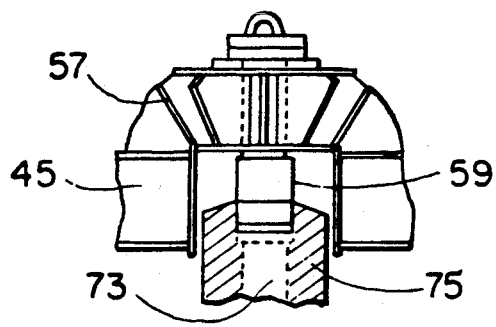
Figure 8:
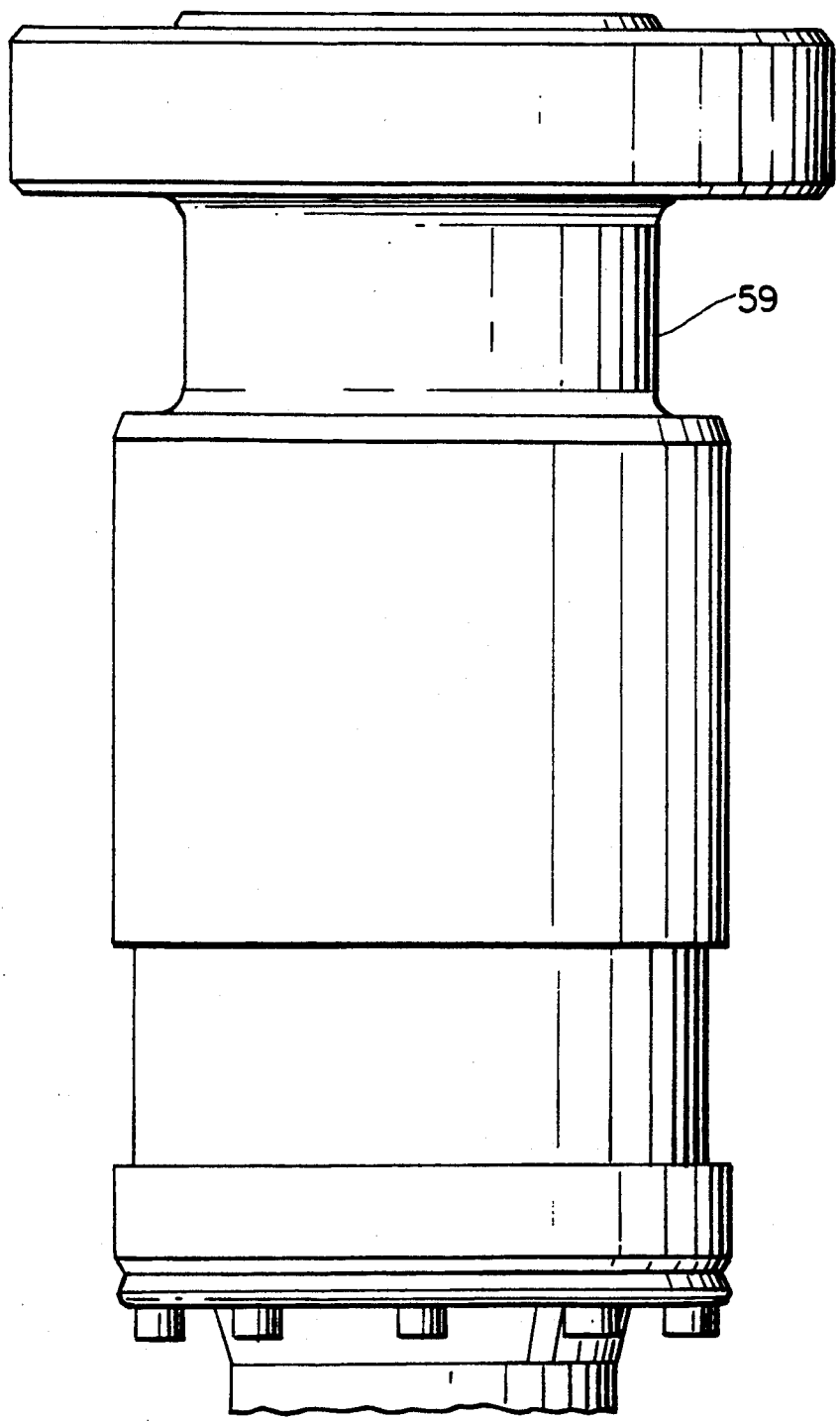
FIG. 8 is an enlarged side a view of connector used for the system of the invention.
Figure 10:
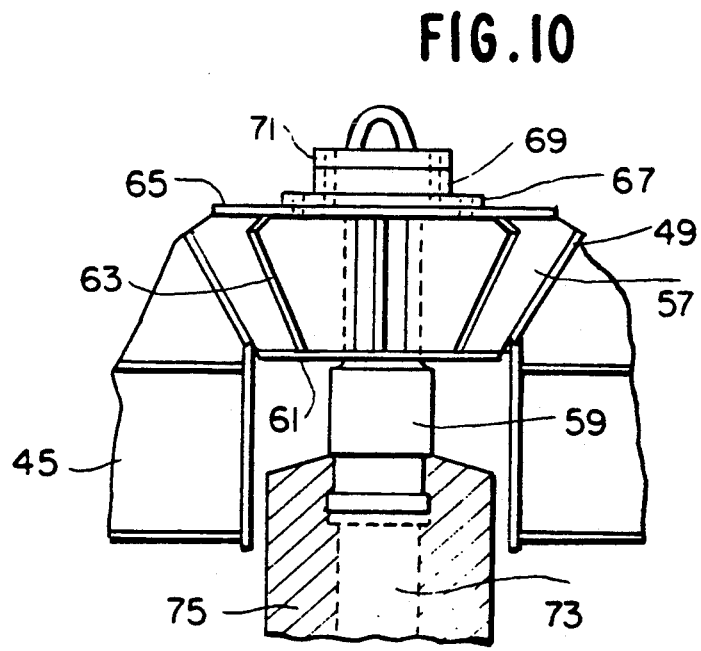
FIG. 10 is a front view of the system showing a flexible line connected to the line supporting arrangement and in its position within the holding structure.

Also, as is to be seen from FIGS. 7A-7C and FIG. 10, the putting in of flexible line, 73, provided with line supporting assembly, 57, is done laterally with its flexible stretch (coating) which has a curve preventer, 75, put in at slot, 51, of supporting structure, 45, so that when properly fitting flexible line, 73, into slot, 51, of cone, 49, provided in supporting structure, 45, flexible line, 73, with supporting structure, 57, at its end, is moved vertically downwards until the curve preventer, 75 fits into cone, 49, inserted in supporting structure, 45. Putting flexible line, 73, into the supporting system of the invention is shown in FIGS. 7A-7C. FIG. 7A shows how line 73 enters sideways by its flexible part. FIG. 7B shows how flexible line 73, fits into the middle of cone, 49, and FIGS. 7C and 10 show downward vertical movement of line, 73, with supporting assembly, 67, at its end, until the support 57 arrangement is inserted into cone 49.

Another alternative for putting in of line, 73, would be to raise it by the middle of cone, 49, without assembly, 57, up above supporting structure, 45, then putting in the arrangement for support arrangement, 57, at neck of connector, 59, and lowering line, 73, until supporting arrangement, 57, fits into cone, 49.

We claim:

1. A supporting system for supporting offshore platform lines and conductor pipes, said supporting system comprising: a supporting structure, at least one cone in said supporting structure, said at least one cone being in a top part of said supporting structure and having in a front part, a radial slot to receive a flexible run of a line and being provided around the exterior with suitably placed stiffeners, and wherein an end of said line to be connected to the supporting structure is provided with a supporting assembly to support the line and being linked to a neck of a connector, said supporting assembly being comprised of split halves consisting of top and bottom plates and a set of equiangularly, circumferentially spaced radial vanes on two central half-round shells, and means connecting aid vanes and said shells at respective tops and bottoms thereof to said top and bottom plates, respectively.

2. A supporting system according to claim 1, wherein said supporting assembly at said one end of said line is fixed by means of an intermediate flange to a pulling head and to said one end of the line, respectively, and wherein said pulling head is disposed above said line and said pulling head and said line are of equal diameter.

3. A supporting system for supporting offshore platform lines and conductor pipes, said supporting system comprising: a supporting structure, at least one cone in said supporting structure, said at least one cone being in a top part of said supporting structure and having in a front part, a radial slot to receive a flexible run of a line and being provided around the exterior with suitably placed stiffeners, and wherein said at least one cone has a guiding device welded thereon, and an end of said line to be connected to the supporting structure is provided with a supporting assembly to support the line and being linked to a neck of a connector, said supporting assembly being comprised of split halves consisting of top and bottom plates and having a set of equiangularly, circumferentially spaced radial vanes on two central half-round shells, and means connecting said vanes and said shells at respective tops and bottoms thereof to said top and bottom plates, respectively.

4. A supporting system according to claim 3, wherein said supporting assembly at said one end of said line is fixed by means of an intermediate flange to a pulling head and to said one end of the line, respectively, and wherein said pulling head is disposed above said line and said pulling head and said line are of equal diameter.

* * * * *